United States Patent [19]
Takayama

[11] Patent Number: 5,583,753
[45] Date of Patent: Dec. 10, 1996

[54] PARALLEL CONTROL TYPE DC—DC CONVERTER

[75] Inventor: Tomio Takayama, Kawasaki, Japan

[73] Assignee: Fujitsu Limited, Kawasaki, Japan

[21] Appl. No.: 361,706

[22] Filed: Dec. 22, 1994

Related U.S. Application Data

[63] Continuation of Ser. No. 57,824, May 7, 1993, abandoned.

[30] Foreign Application Priority Data

May 7, 1992 [JP] Japan .................................... 4-114861

[51] Int. Cl.$^6$ .................................................. H02M 3/335
[52] U.S. Cl. .................................................. 363/71; 363/65
[58] Field of Search .................................. 363/65, 67, 69, 363/71; 323/222, 268, 272, 282

[56] References Cited

U.S. PATENT DOCUMENTS

| | | | |
|---|---|---|---|
| 4,644,458 | 2/1987 | Harafuji et al. | 363/65 |
| 4,912,621 | 3/1990 | Kobayashi et al. | 363/71 |
| 4,947,310 | 8/1990 | Kawabata et al. | 363/71 |
| 5,036,452 | 7/1991 | Loftus | 363/71 |
| 5,088,017 | 2/1992 | Yaginuma et al. | 363/65 |
| 5,245,525 | 9/1993 | Galloway et al. | 363/71 |

*Primary Examiner*—Matthew V. Nguyen
*Attorney, Agent, or Firm*—Staas & Halsey

[57] ABSTRACT

A parallel control type DC—DC converter supplies an output voltage to a load based on voltages supplied from independent power sources. The DC—DC converter is provided with at least first and second converters powered by the independent power sources and commonly grounded and including a switching element, a control circuit driving the switching elements within the first and second converters by ON-pulses having the same width depending the output voltage, and a circuit coupling outputs of the first and second converters in parallel and producing the output voltage.

9 Claims, 10 Drawing Sheets

PARALLEL CONTROL TYPE DC—DC CONVERTER

This application is a continuation, of application Ser. No. 08/057,824, filed May 7, 1993, now abandoned.

BACKGROUND OF THE INVENTION

The present invention generally relates to DC—DC converters, and more particularly to a parallel control type DC—DC converter which supplies power to a load from a plurality of converters.

A DC—DC converter is used as a power source of electronic equipment, and is particularly used as a power source for portable for portable equipment which uses batteries. In such equipment, the batteries are connected in parallel so as to increase the power source capacity, or the batteries are connected in series, and the voltage is converted into a predetermined voltage. If the batteries are directly connected in parallel, a circulating current flows among the batteries due to the differences in the voltages and internal resistances among the batteries. For this reason, the batteries are connected in parallel via diodes which prevent reverse-current flow. In this case, the forward voltage drop of the diode is large compared to the battery voltage, and there is a problem in that the use of the diode deteriorates the utilization efficiency of the batteries.

SUMMARY OF THE INVENTION

Accordingly, it is a general object of the present invention to provide a novel and useful parallel control type DC—DC converter in which the problem described above is eliminated.

Another and more specific object of the present invention is to provide a parallel control type DC—DC converter for supplying an output voltage to a load based on voltages supplied from independent power The converter includes at least first and which second converters powered by the independent power sources and are commonly grounded. Each of the first and second converters includes a switching element, a control circuit for driving the switching elements within the first and second converters by ON-pulses having the same width depending the output voltage, and means, coupling outputs of the first and second converters in parallel, for producing the output voltage. According to the DC—DC converter of the present invention, various kinds of converters can be formed without newly providing a coupling diode, moreover the converters can be operated in parallel. In addition, it is possible to prevent a circulating current from flowing between the batteries which are connected in parallel in order to increase the capacity. Furthermore, only a single control circuit is required to operate the converters in parallel, and the circuit construction can be simplified, thereby enabling an inexpensive DC—DC converter to be realized.

Still another object of the present invention is to provide a parallel control type DC—DC converter for supplying an output voltage to a load based on voltages supplied from independent power sources. The converter includes at least first and second back type converters powered by the independent power sources and which commonly grounded. Each of the first and second back type converters includes a switching element, a control circuit driving the switching elements within the first and second back type converters by ON-pulses having the same width depending the output voltage, and means, coupling outputs of the first and second back type converters in parallel, for producing the output voltage. The means includes a choke coil and a diode which are coupled in series to the output of each of the first and second back type converters. According to the DC—DC converter of the present invention, various kinds of converters can be formed without newly providing a coupling diode. Moreover, the converters can be operated in parallel. In addition, it is possible to prevent a circulating current from flowing between the batteries which are connected in parallel in order to increase the capacity. Furthermore, only a single control circuit is required to operate the converters in parallel, and the circuit construction can be simplified, thereby enabling an inexpensive DC—DC converter to be realized.

Other objects and further features of the present invention will be apparent from the following detailed description when read in conjunction with the accompanying drawings.

DESCRIPTION OF THE PREFERRED EMBODIMENTS

Figure 1:
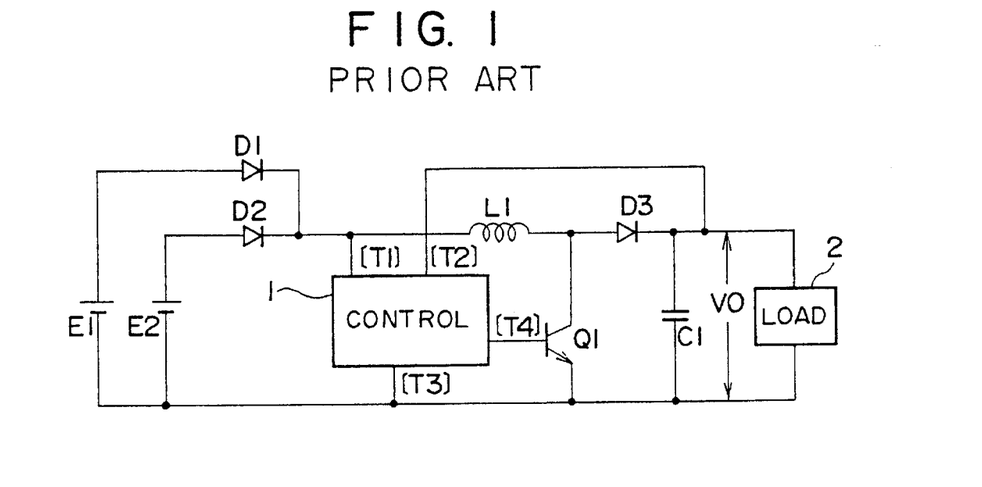
FIG. 1 is a circuit diagram showing a first example of a conventional DC—DC converter.

In order to clarify the problems of the prior art before explaining the present invention, a first example of a conventional DC—DC converter will be described with reference to FIG. 1. In a boost type DC—DC converter as shown in FIG. 1, DC voltages E1 and E2 are realized by power source voltages or batteries. A coupling diode D1 is connected in series to the power source voltage E1 so as to block reverse-current flow, and a coupling diode D2 is connected in series to the power source voltage E2 so as to block reverse-current flow. These coupling diodes D1 and D2 prevent a circulating current from flowing when the values of the power source voltages E1 and E2 are different.

A control circuit 1 controls the ON/OFF state of a transistor Q1 which is provided as a switching element. This control circuit 1 includes a power supply terminal [T1], a control input terminal [T2] for sensing an output voltage Vo of the DC—DC converter, a ground terminal [T3], and a drive terminal [T4] for driving the transistor Q1. In this specification, the terminals of the control circuit 1 which are indicated by the same reference numerals have the same function, unless otherwise indicated.

A choke coil L1 for smoothing is connected to a node which connects the coupling diodes D1 and D2. A rectifying diode D3 is connected in series to the choke coil L1. A smoothing capacitor C1 is connected between a cathode of the rectifying diode D3 and the ground line. A load 2 is connected to an output terminal of the DC—DC converter. For example, this load 2 is a circuit part which is to be driven and is provided within an electronic device, a portable device or the like which are battery-powered. The output voltage Vo of the DC—DC converter is fed back to the control input terminal [T2] so that the control circuit 1 can monitor the output voltage Vo. The DC—DC converter having the above described construction operates as follows.

If the control circuit 1 turns the transistor Q1 ON, a current flows through the choke coil L1, and energy is accumulated within this choke coil L1. Next, if the control circuit 1 turns the transistor Q1 OFF, the energy accumulated within the choke coil L1 is supplied to the load 2 via the rectifying diode D3. In this state, the polarity of the choke coil L1 is negative on the side of the node which connects the coupling diodes D1 and D2 and is positive on the side of the load 2. Accordingly, the output voltage Vo becomes equal to $E1+V_L$ or $E2+V_L$, where $V_L$ denotes a voltage across the terminals of the choke coil L1 during the OFF state of the transistor Q1. Hence, it may be seen that this DC—DC converter operates as a boost type DC—DC converter. If the DC voltages E1 and E2 are the same, the power is equally supplied from the two power sources during operation of the DC—DC converter.

Figure 2:
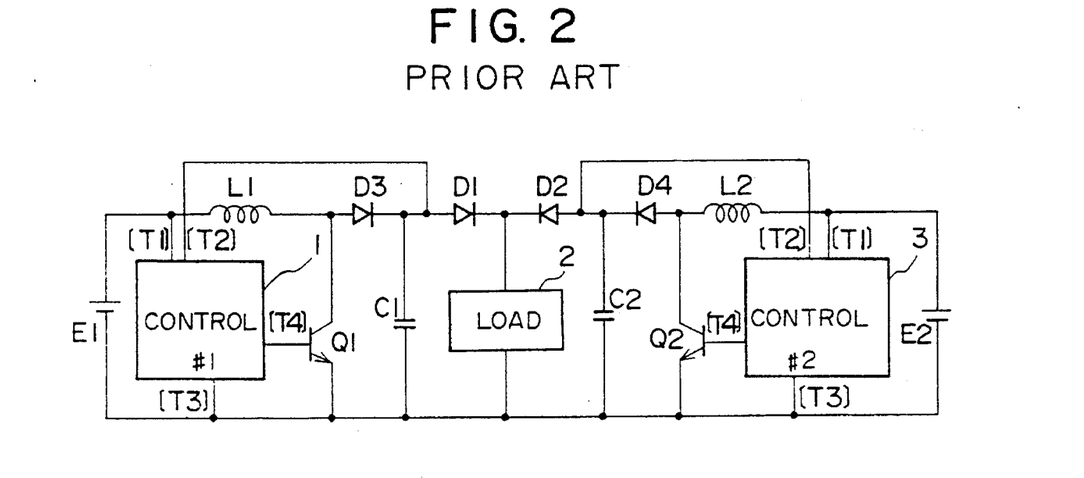
FIG. 2 is a circuit diagram showing a second example of the conventional DC—DC converter.

Next, a description will be given of a second example of the conventional DC—DC converter, by referring to FIG. 2. In FIG. 2, those parts which are the same as those corresponding parts in FIG. 1 are designated by the same reference numerals, and a description thereof will be omitted.

In this second example, a control circuit 1 is provided with respect to the power source voltage E1, and another control circuit 3 is provided with respect to the power source voltage E2. The ON/OFF states of the transistors Q1 and Q2 are controlled by the outputs of the control circuits 1 and 3, and the powers are supplied to the load 2 via the coupling diodes D1 and D2. In this case, the two DC—DC converters respectively operate similarly to the boost type DC—DC converter shown in FIG. 1.

Figure 3:
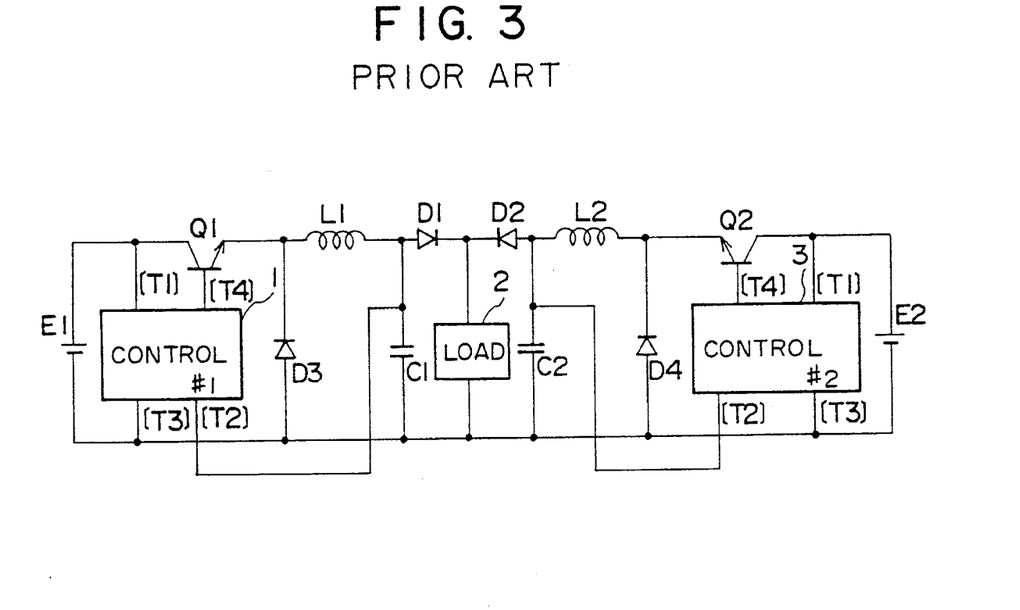
FIG. 3 is a circuit diagram showing a third example of the conventional DC—DC converter.

Next, a description will be given of a third example of the conventional DC—DC converter, by referring to FIG. 3. In FIG. 3, those parts which are the same as those corresponding parts in FIG. 2 are designated by the same reference numerals, and a description thereof will be omitted.

Only the operation on the side of the control circuit 1 shown in FIG. 3 will be given, because the operation on the side of the control circuit 3 is basically the same as that on the side of the control circuit 1. If the control circuit 1 turns the transistor Q1 ON, a current flows through the choke coil L1, and an energy is supplied to the output terminal. Then, if the control circuit 1 turns the transistor Q1 OFF, the choke coil L1 generates a voltage which is negative on the side connected to the transistor Q1 and positive on the side connected to the load 2. The power is supplied from this choke coil L1 to the load 2 via the rectifying diode D3.

The output voltage Vo in this case can be described by the following formula, where $t_{ON}$ denotes the ON time of the transistor Q1 and $t_{OFF}$ denotes the OFF time of the transistor Q1.

$$Vo=E1 \cdot t_{ON}/(t_{ON}+t_{OFF})$$

Accordingly, it may be seen that this DC—DC converter operates as a back type (or step-down type) DC—DC converter.

Figure 4:
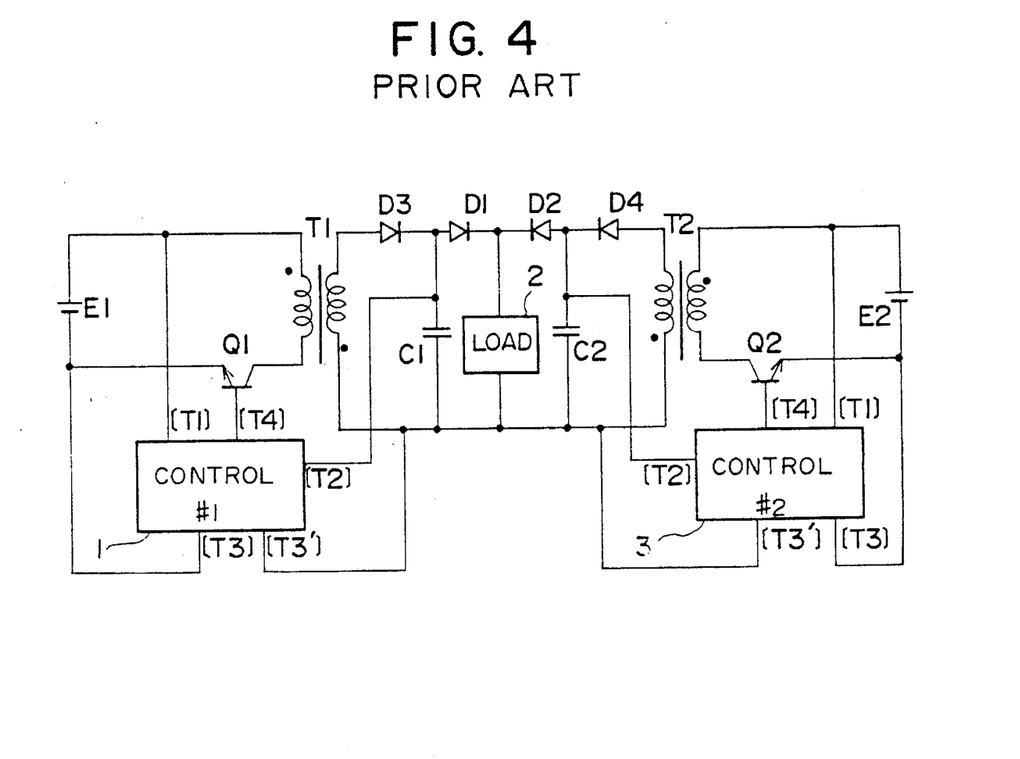
FIG. 4 is a circuit diagram showing a fourth example of the conventional DC—DC converter.

Next, a description will be given of a fourth example of the conventional DC—DC converter, by referring to FIG. 4. In FIG. 4, those parts which are the same as those corresponding parts in FIG. 3 are designated by the same reference numerals, and a description thereof will be omitted.

The DC—DC converter shown in FIG. 4 is a back-boost type DC—DC converter. In other words, it is possible to freely select the boost and back (step-down) modes by changing the ON/OFF ratio of the transistors Q1 and Q2. Only the operation on the side of the control circuit 1 shown in FIG. 4 will be given, because the operation on the side of the control circuit 3 is basically the same as that on the side of the control circuit 1.

The ON/OFF state of the transistor Q1 is controlled by the control circuit 1. Energy is accumulated in a transformer T1 because a primary winding of the transistor T1 is connected as a load of the transistor Q1. A secondary winding of the transformer T1 is connected to a terminal [T3]' of the control circuit 1, so as to use a common ground between the primary and secondary sides of the transformer T1.

If the transistor Q1 turns OFF, the energy accumulated in the transformer T1 is emitted from the secondary winding via the rectifying diode D3. The voltage generated at the secondary side of the transformer T1 is rectified by the rectifying diode D3, and becomes a DC voltage via the smoothing capacitor C1 in which the charge is accumulated. This DC voltage is supplied to the load 2 via the coupling diode D1, thereby supplying power to the load 2. The above described operation is also carried out on the side of the control circuit 3. Hence, the DC voltage generated at a secondary side of a transformer T2 is supplied to the load 2 via the coupling diode D2, thereby supplying power to the load 2.

Figure 5:
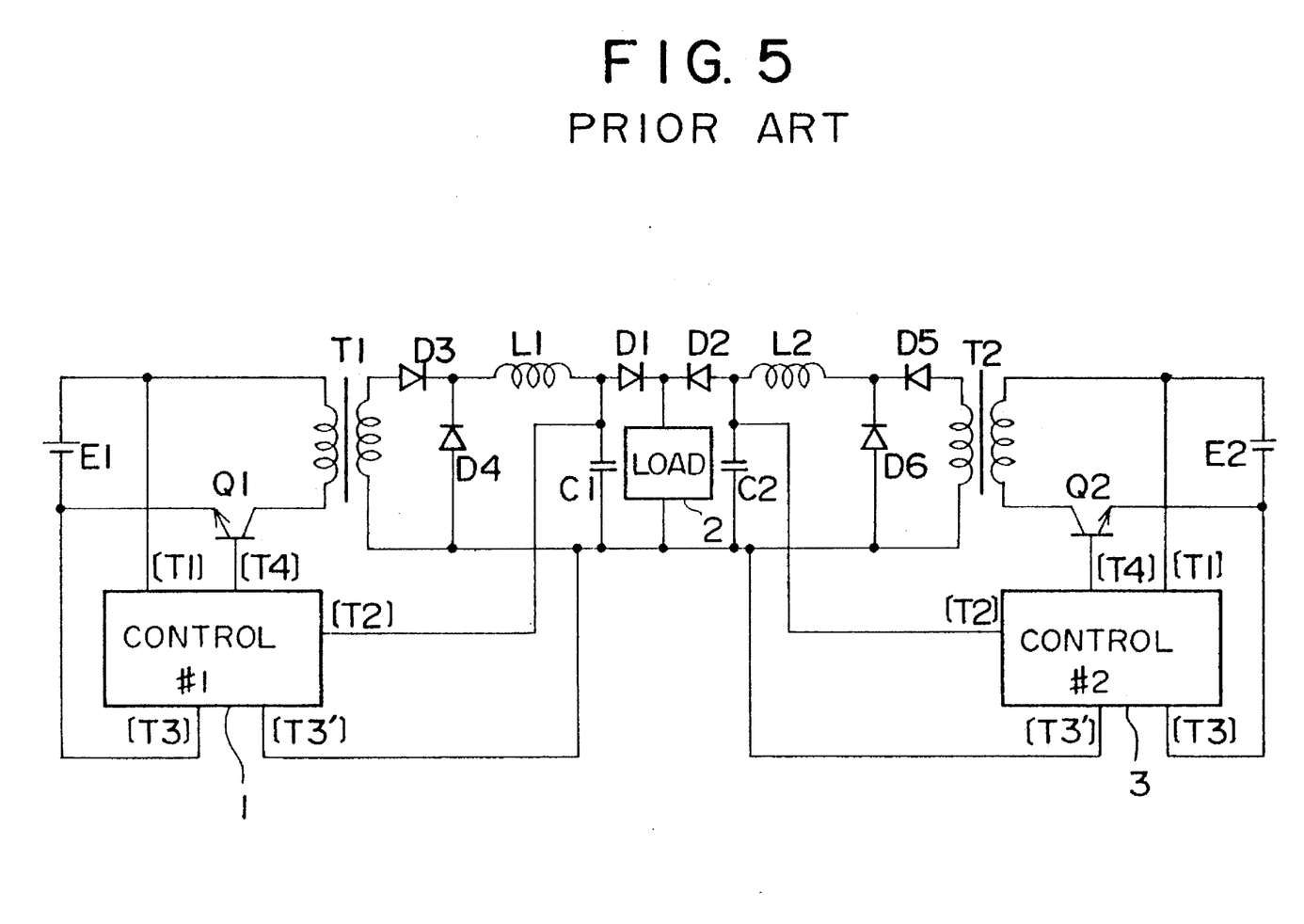
FIG. 5 is a circuit diagram showing a fifth example of the conventional DC—DC converter.

Next, a description will be given of a fifth example of the conventional DC—DC converter, by referring to FIG. 5. In FIG. 5, those parts which are the same as those corresponding parts in FIG.4 are designated by the same reference numerals, and a description thereof will be omitted.

The DC—DC converter shown in FIG. 5 is a forward type DC—DC converter. Only the operation on the side of the control circuit 1 shown in FIG. 5 will be described, because the operation on the side of the control circuit 3 is basically the same as that on the side of the control circuit 1.

When the ON/OFF state of the transistor Q1 is controlled by the control circuit 1, an AC voltage is generated at the secondary side of the transformer T1. This AC voltage is rectified by the rectifying diodes D3 and D4, and is converted into a DC voltage by the choke coil L1 and the smoothing capacitor C1. The DC voltage is supplied to the load 2 via the coupling diode D1, thereby supplying power to the load 2. The above described operation is also carried out on the side of the control circuit 3. Hence, the DC voltage generated at the secondary side of the transformer T2 is supplied to the load 2 via the coupling diode D2, thereby supplying power to the load 2.

According to the conventional parallel control type DC—DC converters described above, power is are supplied to load by supplying the output voltages of the converters via the respective coupling diodes D1 and D2, so as to prevent a circulating current from flowing when the output voltages of the converters differ. But in the case of the DC—DC converter using no transformer, the voltage drop of such coupling diodes D1 and D2 is large compared to the battery (power source) voltages, and there is a problem in that the utilization efficiency of the batteries is poor.

On the other hand, the fourth and fifth examples of the conventional DC—DC converter shown in FIGS. 4 and 5, respectively take measures to reduce the ratio of the voltage drop at the coupling diode compared to the battery voltage. In other words, the fourth and fifth examples and circuits convert the battery voltage to a predetermined high voltage using a boost type DC—DC converter. This makes a diode coupling and relatively improves the utilization efficiency of the batteries which deteriorate due to the voltage drop at the coupling diodes. However, the voltage drop at the coupling diodes cannot be eliminated according to the fourth and fifth examples. In addition, there are problems in that a plurality of DC—DC converters are required and that the cost of the DC—DC converter as a whole increases.

The object of the present invention is to eliminate the problems of the prior art as described above. More particularly, the present invention employs a diode which is used in common as a rectifying diode and a coupling diode (a diode for blocking reverse-current flow), so as to minimize the undesirable effects of the voltage drop at the diode. In addition, the present invention uses a single control circuit. As a result, it is possible to realize an inexpensive parallel control type DC—DC converter having an improved utilization efficiency of batteries.

Figure 6:
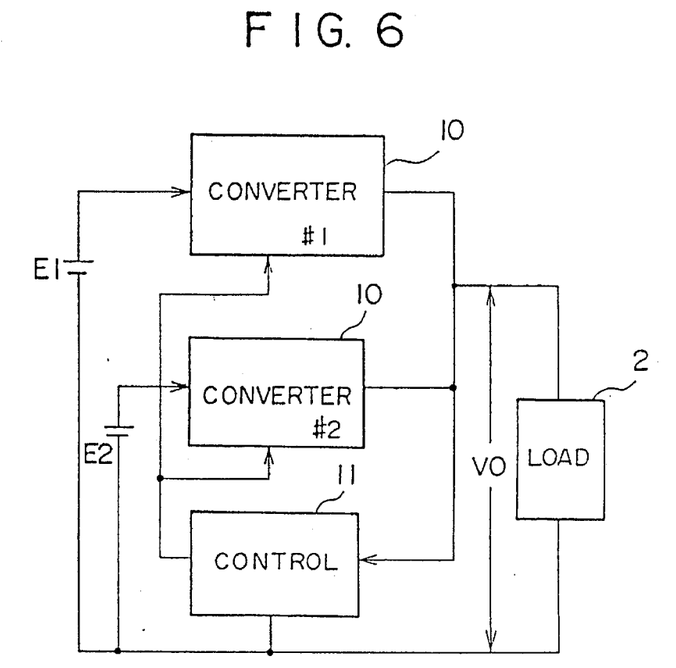
FIG. 6 is a system block diagram for explaining the operating principle of one aspect of the present invention.

Next, a description will be given of the operating principle of one aspect of the present invention by referring to FIG. 6. In FIG. 6, those parts which are the same as those corresponding parts in FIG. 1 are designated by the same reference numerals, and a description thereof will be omitted.

In FIG. 6, at least two converters 10 which are connected to a common ground are powered by independent batteries E1 and E2. Although only two converters 10 are shown in FIG. 6, it is possible to provide three or more converters. A control circuit 11 supplies an output voltage to each converter 10. The switching elements within the converters 10 are driven by ON-pulses which have the same width depending on the output voltage Vo. The control circuit 11 is constructed so as to supply power to the load 2 by connecting outputs of the converters 10 in parallel.

According to the DC—DC converter shown in FIG.6, a diode within each converter 10 is used in common as a rectifying diode and a coupling diode which blocks the reverse-current flow. As a result, it is possible to minimize the undesirable effects of the voltage drop at the diode. In addition, since a plurality of converters 10 are controlled by the single control circuit 11, the circuit construction of the DC—DC converter is simple, and it is possible to realize an inexpensive DC—DC converter.

Figure 7:
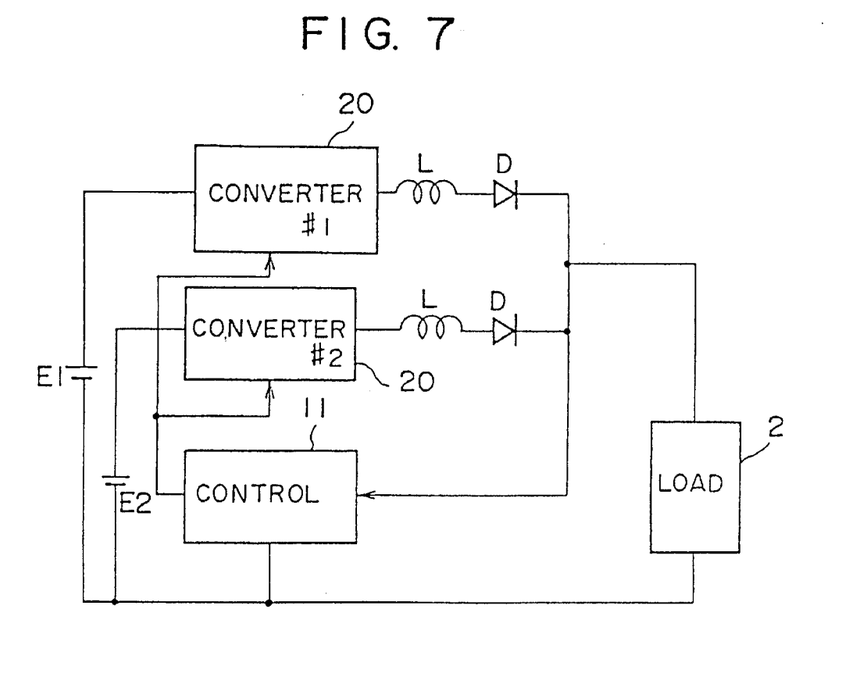
FIG. 7 is a system block diagram for explaining the operating principle of another aspect of the present invention.

Next, a description will be given of the operating principle of another aspect of the present invention, by referring to FIG. 7. In FIG. 7, those parts which are the same as those corresponding parts in FIG. 6 are designated by the same reference numerals, and a description thereof will be omitted.

In FIG. 7, at least two step-down (or back) converters 20 which are connected to a common ground are powered by independent batteries E1 and E2. Although only two step-down converters 20 are shown in FIG. 7, it is possible to provide three or more converters. A control circuit 11 supplies an output voltage to each step-down converter 20. The switching elements within the step-down converters 20 are driven by ON-pulses which have the same width depending on the output voltage Vo. A series circuit which is made up of a choke coil L for smoothing and a diode D is connected to an output of each step-down converter 20. The two series circuits are connected in parallel so as to supply power to the load 2.

According to the DC—DC converter shown in FIG. 7, the diode D is included in a feedback loop which is provided to keep the output voltage Vo constant. For this reason, it is possible to prevent the utilization efficiency of the batteries E1 and E2 from deteriorating due to the voltage drop at the diode D.

Figure 8:
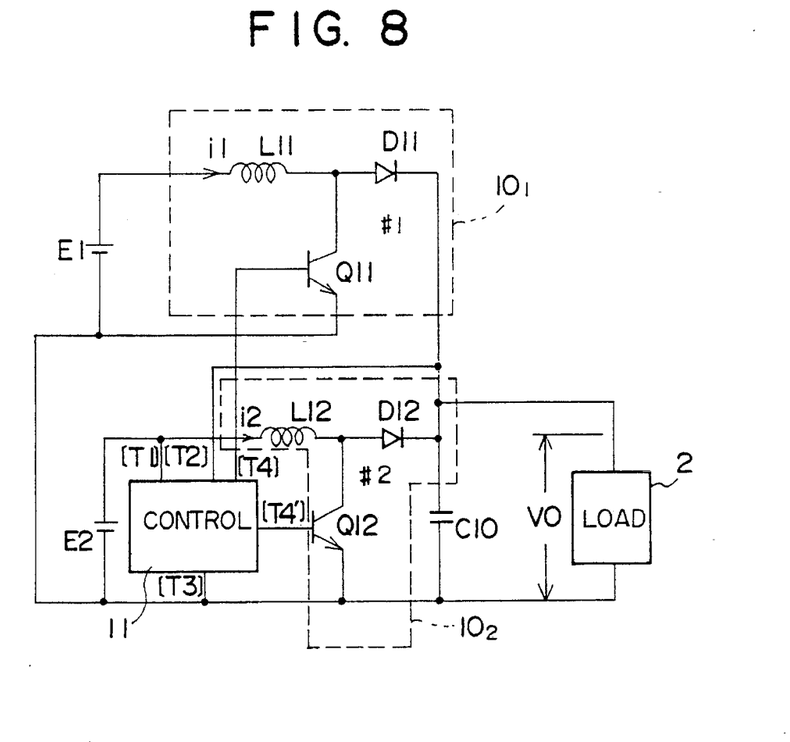
FIG. 8 is a circuit diagram showing a first embodiment of a DC—DC converter according to the present invention.

Next, a description will be given of a first embodiment of the DC—DC converter according to the present invention, by referring to FIG. 8. In FIG. 8, those parts which are the same as those corresponding parts in FIGS. 2 and 6 are designated by the same reference numerals, and a description thereof will be omitted.

A boost type DC—DC converter shown in FIG. 8 generally includes first and second converters $10_1$ and $10_2$, a control circuit 11 and a smoothing capacitor C10. The first converter $10_1$ is made up of a choke coil L11, a switching transistor Q11 and a diode D11. On the other hand, the second converter $10_2$ is made up of a choke coil L12, a switching transistor Q12 and a diode D12. These diodes D11 and D12 are used in common as rectifying diodes and coupling diodes, and outputs of these diodes D11 and D12 are connected to a common node. An output of the boost type DC—DC converter is obtained from this common node, and this common node is connected to the load 2. For example, this load 2 is a circuit part which is to be driven and is provided within an electronic device, (i.e., a portable device or the like which is battery-powered).

The smoothing capacitor C10 is connected in common to outputs of the first and second converters $10_1$ and $10_2$. A base of the switching transistor Q11 of the first converter $10_1$ is driven by a signal from a terminal [T4']of the control circuit 11. On the other hand, a base of the switching transistor Q12 of the second converter $10_2$ is driven by a signal from a terminal [T4']of the control circuit 11. A ground terminal [T3]of the control circuit 11 is connected to the ground of the batteries E1 and E2 and to the ground of an output circuit. An output voltage Vo is input to an output voltage monitor terminal [T2]of the control circuit 11. In addition, the power from the battery E2 is supplied to a terminal [T1]of the control circuit 11. The boost type DC—DC converter having the above described construction operates as follows.

ON-signals which are subjected to pulse width modulation (PWM) depending on the output voltage Vo and have the same pulse width, are output from the driving terminals [T4] and [T4'] of the control circuit 11. When the switching transistors Q11 and Q12 are ON, energy is accumulated in the choke coils L11 and L12 and the energy is supplied to the output terminal. On the other hand, when the switching transistors Q11 and Q12 are OFF, the energy accumulated in the choke coils L11 and L12 are emitted.

Figure 9:
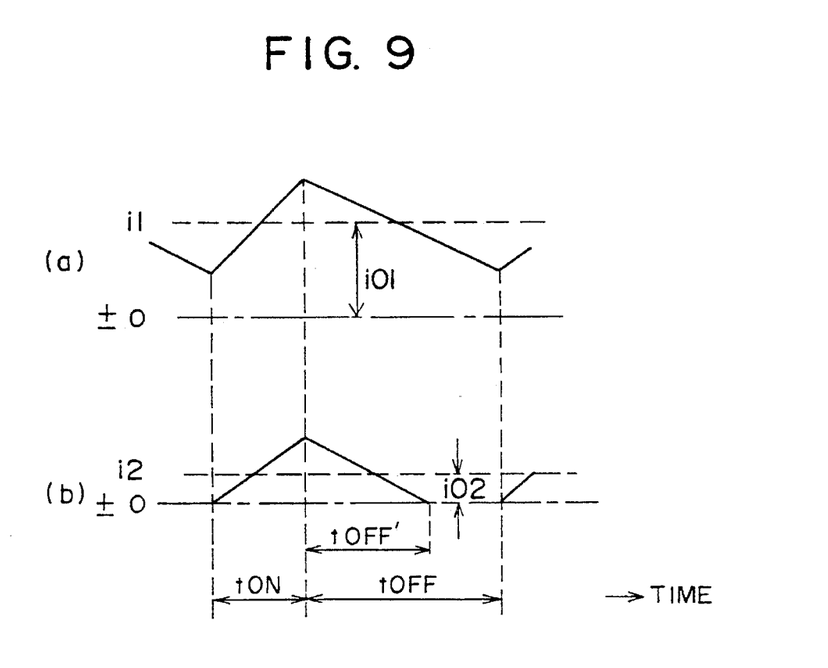
FIG. 9 shows current waveforms for explaining the operation of the first embodiment.

In this state, the voltages generated at the choke coils L11 and L12 are respectively added to the battery voltages E1 and E2, and the DC voltages which are rectified via the diodes D11 and D12 are output as the output voltage Vo. FIG. 9 shows current waveforms for explaining the operation of this embodiment. In FIG. 9, (a) shows the current waveform of the first converter $10_1$ and (b) shows the current waveform of the second converter $10_2$. If the battery voltages E1 and E2 are unbalanced, the current waveforms of the first and second converters $10_1$ and $10_2$ differ as shown in FIG. 9.

One period T of the switching can be described by $T = t_{ON} + t_{OFF}$ where $t_{ON}$ denotes the ON-time of the switching transistor Q11 within the first converter $10_1$ and $t_{OFF}$ denotes the OFF-time of the switching transistor Q11. The ON-time of the switching transistor Q12 within the second converter $10_2$ is also denoted by $t_{ON}$, and the OFF-time of the switching transistor Q12 is denoted by $t_{OFF}$. As may be seen from FIG. 9, a load current i1 of the first converter $10_1$ flows throughout the entire period T; however, a load current i2 of the second converter $10_2$ is 0 during the OFF-time $t_{OFF}$, of the switching transistor Q12 of the second converter $10_2$. The output voltage Vo, when such currents flow, can be described by the following formula (1):

$$Vo = E1 ((t_{ON} + t_{OFF})/t_{OFF}) \quad (1)$$
$$= E2 ((t_{ON} + t_{OFF})/t_{OFF})$$

Of course, if the battery voltages E1 and E2 are balanced, the current waveforms of the load currents i1 and i2 become the same, and the operation waveform becomes as shown in FIG. 9 (a) or (b).

In a case where the battery voltage E1 is higher than the battery voltage E2, $E1(t_{ON} + t_{OFF}) > E2(t_{ON} + t_{OFF'})$. If $t_{OFF} = t_{OFF'}$, in this case, the voltage due to the battery E2 is lower than that due to the battery E1, and no power is supplied from the battery E2. However, if the voltage generated by the choke coil L12 during the OFF-time $t_{OFF}$ becomes Vo−E2 and the OFF-time $t_{OFF'}$ becomes shorter, the formula (1) is satisfied and power is then also supplied from the battery E2. In this state, average values i01 and i02 of the load currents i1 and i2 respectively supplied from the batteries E1 and E2 become as shown in FIG. 9. In other words, the battery with the larger battery voltage supplies more power. In addition, the average values i01 and i02 of the load currents i1 and i2 become the current which is supplied to the load 2 from the batteries E1 and E2.

In this embodiment, the voltage drop of the diode D11 affects the voltage which is generated by the battery E1 and the choke coil L11. For this reason, the utilization efficiency of the batteries is improved compared to the conventional DC—DC converter. Generally, the voltage of a battery having the larger remaining capacity is higher among batteries having the same standard. Hence, the batteries which are connected in parallel naturally become balanced during use. In this embodiment, the output voltage Vo of the DC—DC converter is always higher than the input voltage, and the effect of the voltage drop at the diodes D11 and D12 is small compared to the case where the batteries E1 and E2 are connected in series. In addition, since the driving power of the control circuit 11 is constantly supplied from the batteries E1 and E2, the power consumption is reduced compared to the case where the power is supplied from the output terminal. Furthermore, it is possible to realize an inexpensive DC—DC converter according to this embodiment, because only a single control circuit 11 is required.

Figure 10:
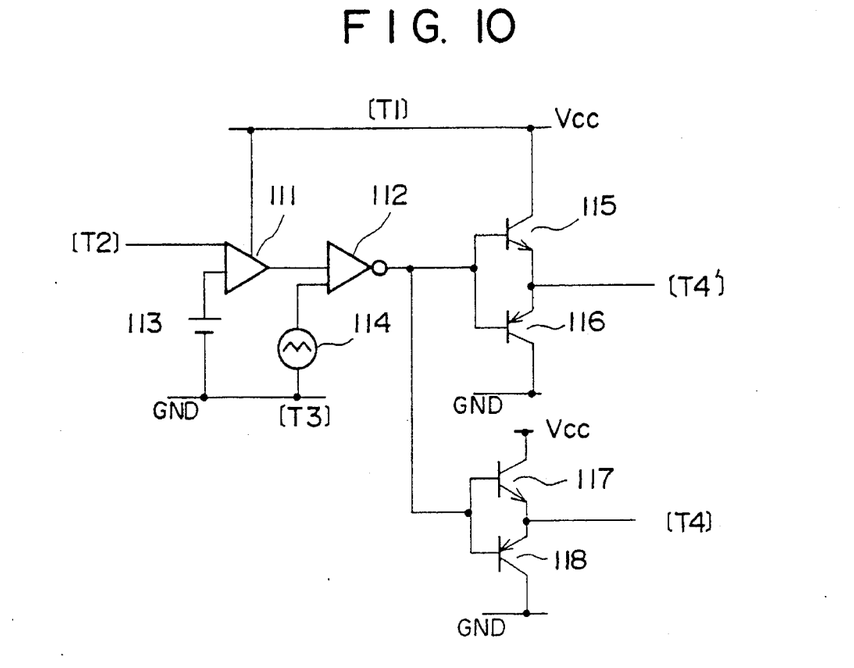
FIG. 10 is a circuit diagram showing an embodiment of a control circuit of the first embodiment.

FIG. 10 shows an embodiment of the control circuit 11. The control circuit 11 shown in FIG. 10 includes a differential amplifier 111, a comparator 112, a power source 113, a sawtooth wave generator 114, and transistors 115 through 117 which are connected as shown. The differential amplifier 111 has one input connected to the output voltage monitor terminal [T2] and another input connected to the power source 113 which supplies a reference voltage $V_{REF}$. This differential amplifier 111 is powered by a power source voltage Vcc (=E2) which is supplied from the battery E2 via the terminal [T1]. The comparator 112 has one input connected to an output of the differential amplifier 111 and another input connected to the sawtooth wave generator 114 which generates a sawtooth wave. The power source 113 and the sawtooth wave generator 114 are grounded via the ground terminal [T3].

An output of the comparator 112 is coupled to the driving terminal [T4'] via a first circuit which is made up of the transistors 115 and 116, and is also coupled to the driving terminal [T4] via a second circuit which is made up of the transistors 117 and 118. More particularly, the driving terminal [T4'] is connected to a node which connects the transistors 115 and 116, and the driving terminal [T4] is connected to a node which connects the transistors 117 and 118. The transistors 115 and 117 are connected to the terminal [T1], and the transistors 116 and 118 are grounded via the ground terminal [T3].

The control circuit 11 shown in FIG. 10 may be used in any of the following embodiments which will be described hereunder.

Figure 11:
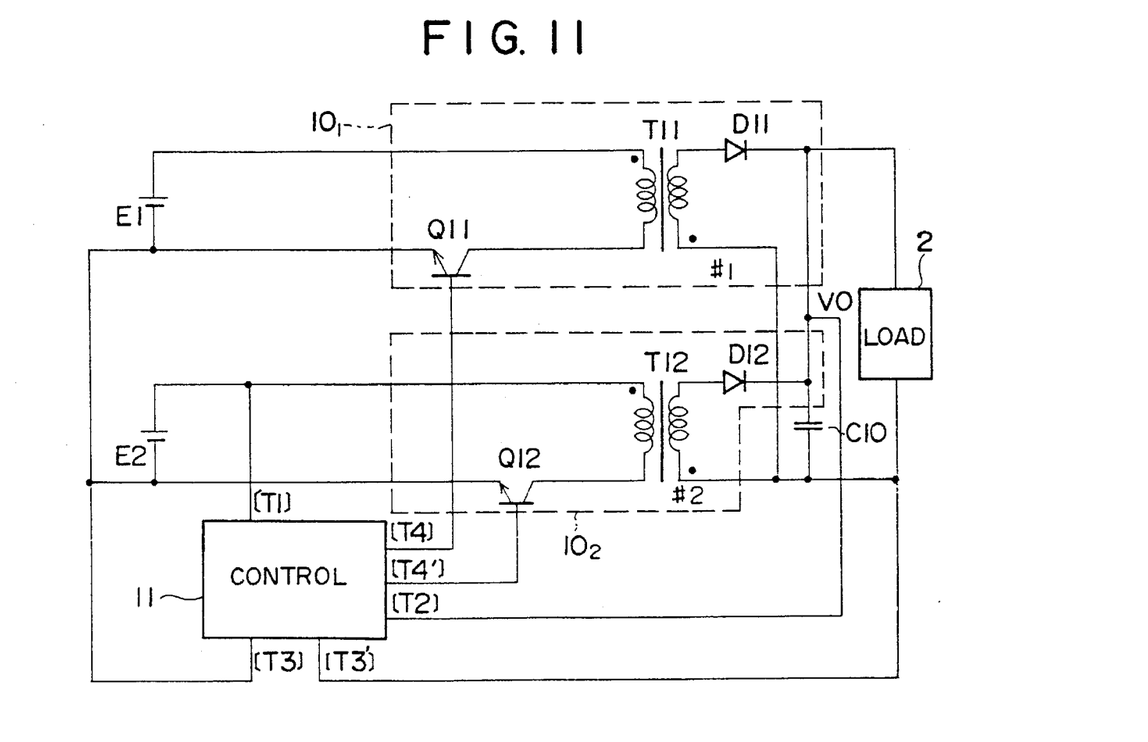
FIG. 11 is a circuit diagram showing a second embodiment of the DC—DC converter according to the present invention.

Next, a description will be given of a second embodiment of the DC—DC converter according to the present invention, by referring to FIG. 11. In FIG. 11, those parts which are the same as those corresponding parts in FIGS. 4 and 8 are designated by the same reference numerals, and a description thereof will be omitted.

A back-boost type DC—DC converter shown in FIG. 11 also uses only a single control circuit 11, and first and second converters $10_1$ and $10_2$ are controlled by this control circuit 11. The first converter $10_1$ includes a transformer T11, a switching transistor Q11 and a diode D11. On the other hand, the second converter $10_2$ includes a transformer T12, a switching transistor Q12 and a diode D12. The diodes D11 and D12 of the first and second converters $10_1$ and $10_2$ are used in common as both rectifying and coupling diodes.

A driving terminal [T4] of the control circuit 11 is connected to a base of the switching transistor Q11, and a driving terminal [T4'] is connected to a base of the switching transistor Q12. The diodes D11 and D12 of the first and second converters $10_1$ and $10_2$ are connected at a common node, and such common node is connected to a smoothing capacitor C10. The common node which connects the diodes D11 and D12 becomes an output terminal which is connected to the load 2. A ground terminal [T3] of the control circuit 11 is connected to the ground of the batteries E1 and E2 and a ground terminal [T3'] of the control circuit 11 is connected to the ground of an output circuit, so as to use a common ground. An output voltage Vo is input to an output voltage monitor terminal [T2] of the control circuit 11. In addition, the power from the battery E2 is supplied to a terminal [T1] of the control circuit 11. The back-boost type DC—DC converter having the above described construction operates as follows.

ON-signals which are subjected to PWM depending on the output voltage Vo and have the same pulse width, are output from the driving terminals [T4]and [T4']of the control circuit 11. When the switching transistors Q11 and Q12 are ON, energy is accumulated in the transformers T11 and T12. On the other hand, when the switching transistors Q11 and Q12 are OFF, the energy accumulated in the transformers T11 and T12 is emitted. As shown in FIG. 11, the polarities of the primary winding and the secondary winding are opposite to each other for both the transformers T11 and T12. Hence, the transformers T11 and T12 generate positive voltages when the switching transistors Q11 and Q12 are OFF, and the generated positive voltages are supplied to the smoothing capacitor C10 via the diodes D11 and D12, thereby storing a charge in the smoothing capacitor C10. At the same time, the output voltage Vo is generated at the smoothing capacitor C10, and power is supplied to the load 2 from the output terminal of the back-boost DC—DC converter.

The output voltage Vo in this case can be described by the following formula (2), where N1 denotes the number of turns of the primary windings of the transformers T11 and T12, N2 denotes the number of turns of the secondary windings of the transformers T11 and T12, $t_{ON}$ denotes the ON-time of the switching transistors Q11 and Q12 during one switching period, and $t_{OFF}$ denotes the OFF-time of the switching transistors Q11 and Q12.

$$Vo = (N2/N1)E1 \cdot (t_{ON}/t_{OFF}) \qquad (2)$$
$$= (N2/N1)E2 \cdot (t_{ON}/t_{OFF})$$

In this embodiment, the outputs of the diodes D11 and D12 of the respective first and second converters $10_1$ and $10_2$ are connected to a common node, and power is supplied to the load 2 via this common node. In addition, the utilization efficiency of the batteries is improved by an amount corresponding to the elimination of the need to provide independent coupling diodes for blocking the reverse-current flow.

Figure 12:
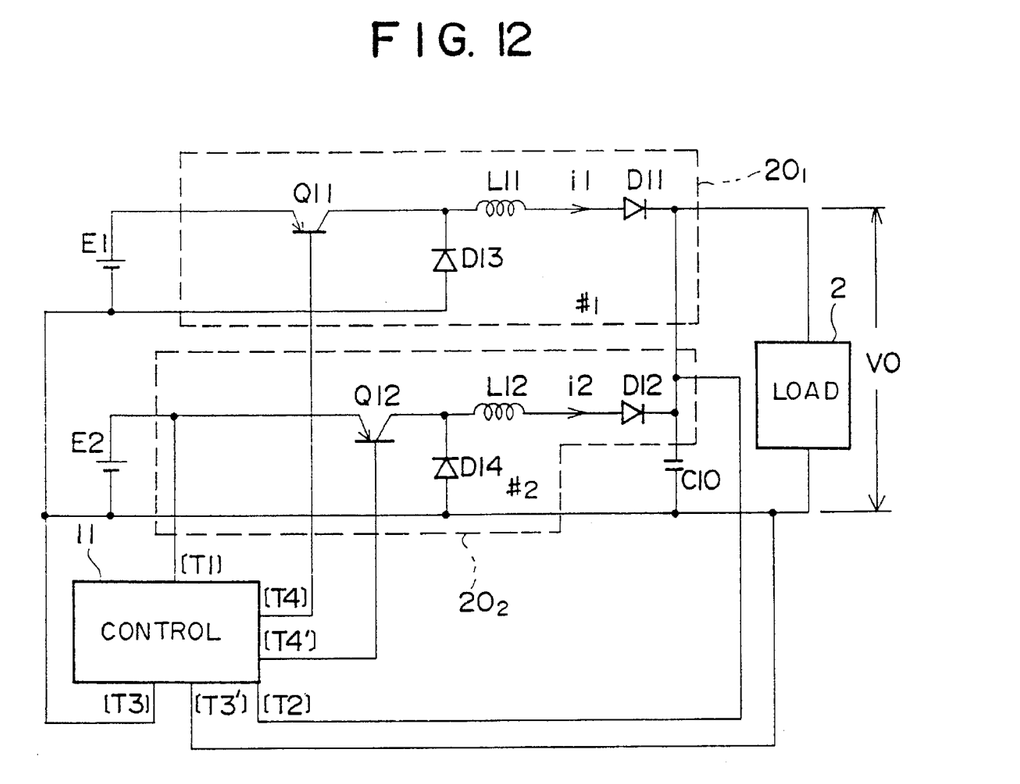
FIG. 12 is a circuit diagram showing a third embodiment of the DC—DC converter according to the present invention.

Next, a description will be given of a third embodiment of the DC—DC converter according to the present invention, by referring to FIG. 12. In FIG. 12, those parts which are the same as those corresponding parts in FIG. 3 and 8 are designated by the same reference numerals, and a description thereof will be omitted.

In a back (step-down) type DC—DC converter shown in FIG.12, a first back (step-down) converter $20_1$ includes a switching transistor Q11, diodes D11 and D13, and a choke coil L11. On the other hand, a second back (step-down) converter $20_2$ includes a switching transistor Q12, diodes D12 and D14, and a choke coil L12. The first and second back converters $20_1$ and $20_2$ are controlled by a single control circuit 11.

A driving terminal [T4]of the control circuit 11 is connected to a base of the switching transistor Q11, and a driving terminal [T4']is connected to a base of the switching transistor Q12. The diodes D11 and D12 of the first and second back converters $20_1$ and $20_2$ are connected at a common node, and this common node is connected to a smoothing capacitor C10. The common node which connects the diodes D11 and D12 becomes an output terminal which is connected to the load 2. A ground terminal [T3]of the control circuit 11 is connected to the ground of the batteries E1 and E2 and a ground terminal [T3']of the control circuit 11 is connected to the ground of an output circuit, so as to use a common ground. An output voltage Vo is input to an output voltage monitor terminal [T2]of the control circuit 11. In addition, the power from the battery E2 is supplied to a terminal [T1]of the control circuit 11. The back type DC—DC converter having the above described construction operates as follows.

ON-signals which are subjected to PWM depending on the output voltage Vo and have the same pulse width, are output from the driving terminals [T4]and [T4']of the control circuit 11. When the switching transistors Q11 and Q12 are ON, energy is accumulated in the choke coils L11 and L12. On the other hand, when the switching transistors Q11 and Q12 are OFF, the energy accumulated in the choke coils L11 and L12 are emitted via the diodes D11 and D12.

Figure 13:
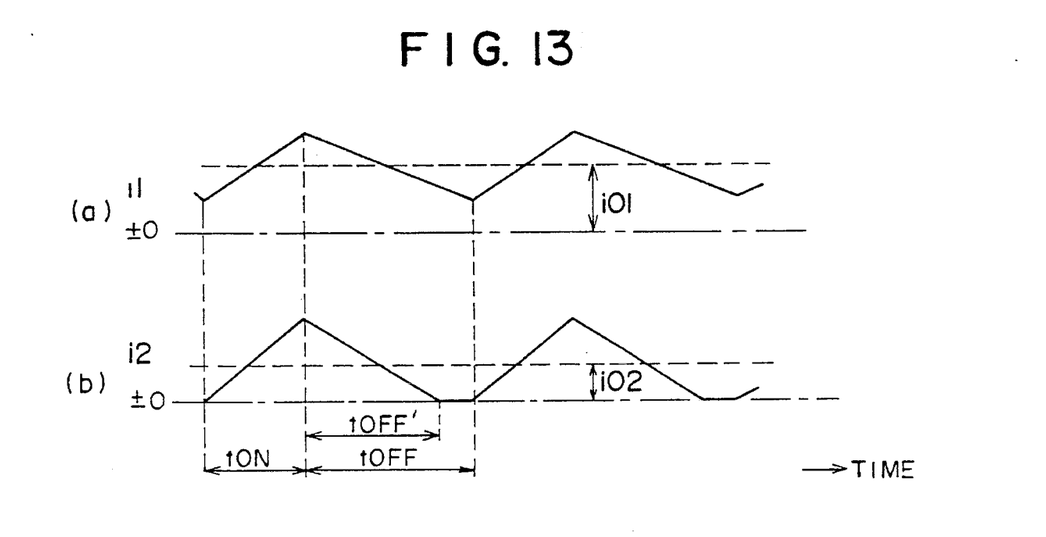
FIG. 13 shows current waveforms for explaining the operation of the third embodiment.

FIG. 13 shows current waveforms for explaining the operation of this embodiment. In FIG.13, (a) shows the current waveform of the first back converter $20_1$ and (b) shows the current waveform of the second back converter $20_2$.

In this case, the output voltage Vo of the back type DC—DC converter shown in FIG. 12 can be described by the following formula (3), where $t_{ON}$ within the first back converter $20_1$ and the ON-time of 10 the switching transistor Q12 within the second back converter $20_2$, $t_{OFF}$ denotes the OFF-time of the switching transistor Q11, and $t_{OFF'}$ denotes the OFF-time of the switching transistor Q12 within the second back converter $20_2$.

$$Vo = E1(t_{ON}/(t_{ON}+t_{OFF})) \qquad (3)$$
$$= E2(t_{ON}/(t_{ON}+t_{OFF}))$$

As may be seen from FIG. 13, a load current i1 of the first back converter $20_1$ flows throughout the entire period $T=t_{ON}+t_{OFF}$, however, a load current i2 of the second back converter $20_2$ is 0 following the OFF-time $t_{OFF'}$ of the switching transistor Q12 of the second back converter $20_2$. If the battery voltages E1 and E2 are unbalanced, the current waveforms of the first and second back converters $20_1$ and $20_2$ differ as shown in FIG. 13. On the other hand, the current waveforms of the first and second back converters $20_1$ and $20_2$ become the same if the battery voltages E1 and E2 are balanced.

If the battery voltage E1 is higher than the battery voltage E2, and $E1 \cdot t_{ON} > E2 t_{ON}$ and $t_{OFF=tOFF'}$, the voltage due to the battery E2 becomes lower than that due to the battery E1 as may be seen from the above formula (3). Thus, no power is supplied from the battery E2 in this case. However, in this embodiment, the voltage which is generated at the choke coil L12 during the OFF-time $t_{OFF'}$ of the switching transistor Q12 becomes the output voltage Vo, and power is also supplied from the battery E2 as the OFF-time $t_{OFF7}$ of the switching transistor Q12 becomes shorter. For this reason, the battery voltages of E1 and E2 become in balance during use, similarly to the boost type DC—DC converter shown in FIG. 8.

The diodes D11 and D12 are provided as coupling diodes for blocking the reverse-current flow. In other words, these diodes D11 and D12 are provided to prevent the charge accumulated in the smoothing capacitor C10 from flowing in the reverse direction if one of the outputs of the first and second back converters $20_1$ and $20_2$ is extremely low and the switching transistors Q11 and Q12 are ON. At the same time, these diodes also function as rectifying diodes which rectify the voltages generated at the choke coils L11 and L12. As in the embodiments described above, this embodiment also requires only a single control circuit 11, and it is possible to realize an inexpensive back type DC—DC converter.

Figure 14:
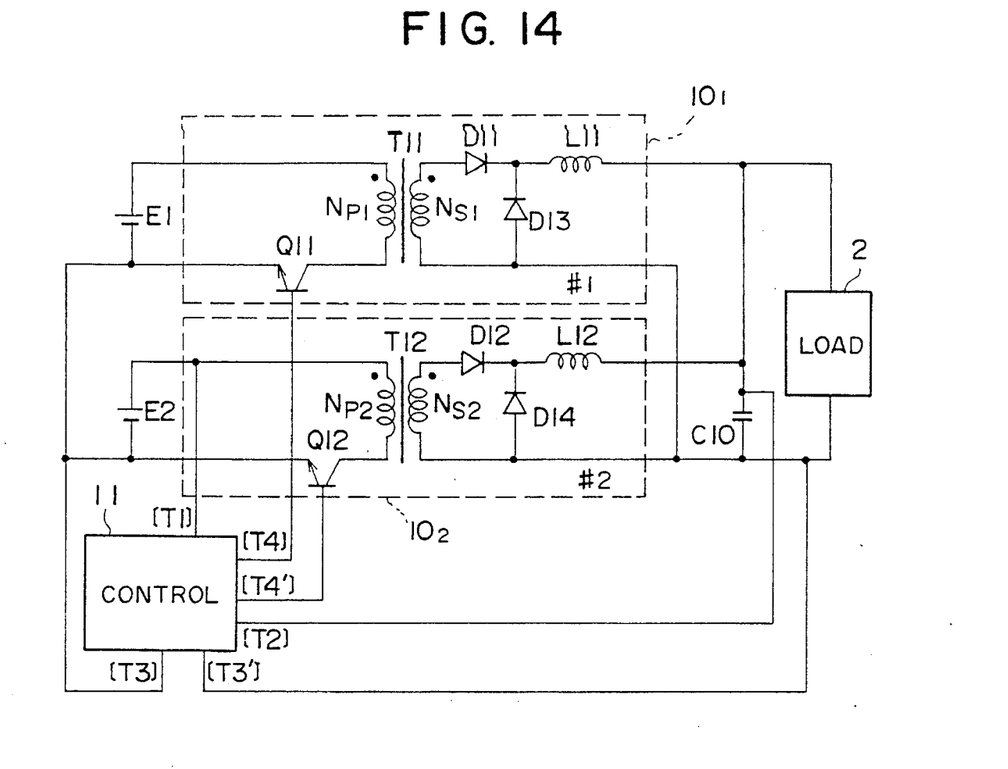
FIG. 14 is a circuit diagram showing a fourth embodiment of the DC—DC converter according to the present invention.

Next, a description will be given of a fourth embodiment of the DC—DC converter according to the present invention, by referring to FIG. 14. In FIG. 14, those parts which are the same as those corresponding parts in FIGS. 5 and 12 are designated by the same reference numerals, and a description thereof will be omitted.

A forward type DC—DC converter shown in FIG. 14 includes a first converter $10_1$, a second converter $10_2$, a control circuit 11 and a smoothing capacitor C10. The first converter $10_1$ includes a switching transistor Q11, a transformer T11, diodes D11 and D13, and a choke coil L11. On the other hand, the second converter $10_2$ includes a switching transistor Q12, a transformer T12, diodes D12 and D14, and a choke coil L12. The first and second converters $10_1$ and $10_2$ are controlled by the single control circuit 11. The diodes D11 and D12 are connected in series to the secondary windings of the respective transformers T11 and T12, and function as both rectifying diodes and coupling diodes.

A driving terminal [T4']of the control circuit 11 is connected to a base of the switching transistor Q11, and a driving terminal [T4']is connected to a base of the switching transistor Q12. The choke coils L11 and L12 of the first and second converters $10_1$ and $10_2$ are connected at a common node, and this common node is connected to a smoothing capacitor C10. The common node which connects the choke coils L11 and L12 becomes an output terminal which is connected to the load 2. A ground terminal [T3]of the control circuit 11 is connected to the ground of the batteries E1 and E2 and a ground terminal [T3']of the control circuit 11 is connected to the ground of an output circuit, so as to use a common ground. An output voltage Vo is input to an output voltage monitor terminal [T2]of the control circuit 11. In addition, the power from the battery E2 is supplied to a terminal [T1]of the control circuit 11. The forward type DC—DC converter having the above described construction operates as follows.

ON-signals which are subjected to depending on the output voltage Vo and have the same pulse width, are output from the driving terminals [T4]and [T4']of the control circuit 11. When the switching transistors Q11 and Q12 are ON, the battery voltages E1 and E2 are respectively applied to the primary windings of the transformers T11 and T12, and voltages proportional to the number of turns of the secondary windings of the transformers T11 and T12 are generated. The generated voltages are output via the diodes D11 and D12, thereby supplying energy to the choke coils L11 and L12. On the other hand, when the switching transistors Q11 and Q12 are OFF, back electromotive forces are generated at the primary and secondary windings of the transformers T11 and T12, and the diodes D11 and D12 become non-conductive. The respective amounts of energy accumulated in the choke coils L11 and L12 during the ON-time of the transistors Q11 and Q12 are emitted via the diodes D13 and D14, functioning as rectifying diodes.

The output voltage Vo in this case can be described by the following formula (4), where NP1 denotes the number of turns of the primary winding of the transformer T11, NS1 denotes the number of turns of the secondary winding of the transformer T11, NP2 denotes the number of turns of the primary winding of the transformer T12, NS3 denotes the number of turns of the secondary winding of the transformer T12, $t_{ON}$ denotes the ON-time of the switching transistors Q11 and Q12 during one switching period, $t_{OFF}$ denotes the OFF-time of the switching transistor Q11, and $t_{OFF}$, denotes the OFF-time of the switching transistor Q12.

$$Vo = E1 \cdot (NS1/NP1)(t_{ON}/(t_{ON} + t_{OFF})) \quad (4)$$
$$= E2 \cdot (NS2/NP1)(t_{ON}/(t_{ON} + t_{OFF}))$$

In this embodiment, the load 2 is not connected in series to the outputs of coupling diodes. Hence, the utilization efficiency of the batteries E1 and E2 will not deteriorate due to the voltage drop at the coupling diodes.

Figure 15:
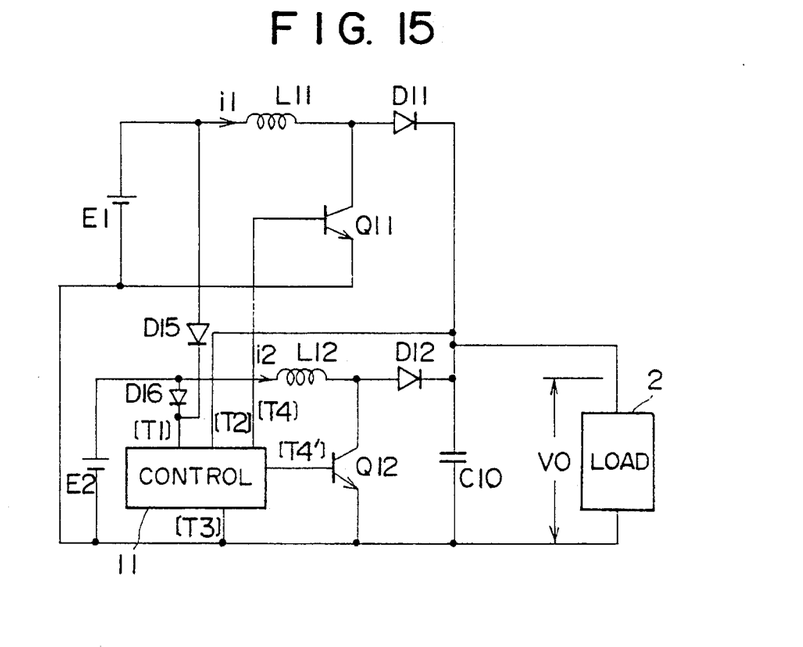
FIG. 15 is a circuit diagram showing a fifth embodiment of the DC—DC converter according to the present invention.

Next, a description will be given of a fifth embodiment of the DC—DC converter according to the present invention, by referring to FIG. 15. In FIG. 15, those parts which are the same as those corresponding parts in FIG. 8 are designated by the same reference numerals, and a description thereof will be omitted.

This embodiment is basically the same as the first embodiment shown in FIG. 8, except for the method of supplying power to the control circuit 11. In the first embodiment, the power is supplied to the control circuit 11 from the battery E2. However, this embodiment supplies power to the control circuit 11 from the batteries E1 and E2 in parallel via diodes D15 and D16. According to such a connection, it is possible to supply power to the control circuit 11 from one of the batteries E1 and E2 even if the other wears out.

Figure 16:
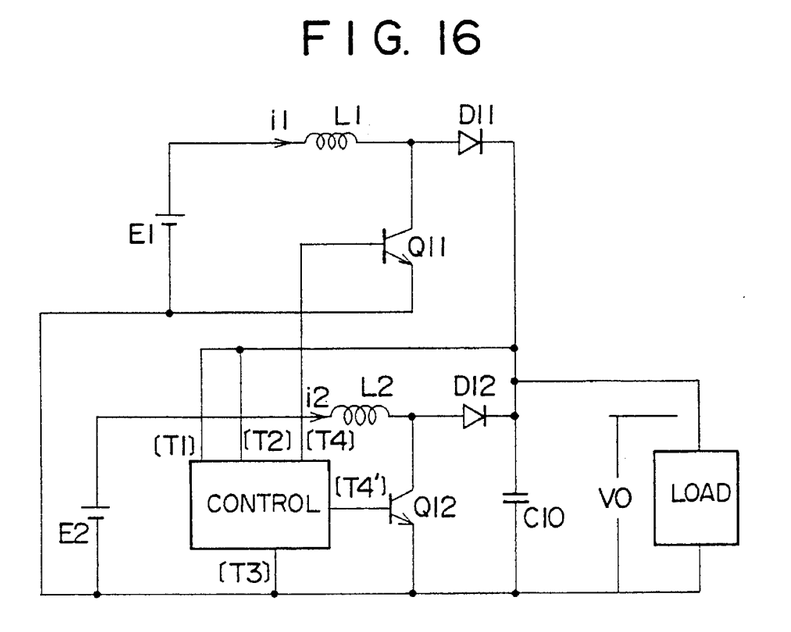
FIG. 16 is a circuit diagram showing a sixth embodiment of the DC—DC converter according to the present invention.

Next, a description will be given of a sixth embodiment of the DC—DC converter according to the present invention, by referring to FIG. 16. In FIG. 16, those parts which are the same as those corresponding parts in FIG. 8 are designated by the same reference numerals, and a description thereof will be omitted.

This embodiment is also basically the same as the first embodiment shown in FIG. 8, except that this embodiment supplies power to the power supplying terminal [T1]of the control circuit 11 from the output terminal of the DC—DC converter. In this embodiment, before the DC—DC converter operates, power is supplied to the power supply terminal [T1]of the control circuit 11 via a first route - - E1 - - - >L12 - - - >D12 - - ; or a second route - - E2 - - - >L11 - - - >D12.

When the power is supplied to the control circuit 11 from the output terminal of the DC—DC converter, the output voltage Vo stabilizes. In addition, since the output voltage Vo is higher than the input voltage, the driving voltage amplitudes of the switching transistors Q11 and Q12 must be set high if field effect transistors (FETs) are used for the switching transistors Q11 and Q12. But according to this embodiment, it is possible to drive the switching transistors Q11 and Q12 with high voltage amplitudes, and this feature contributes to the stable operation of the DC—DC converter.

Figure 17:
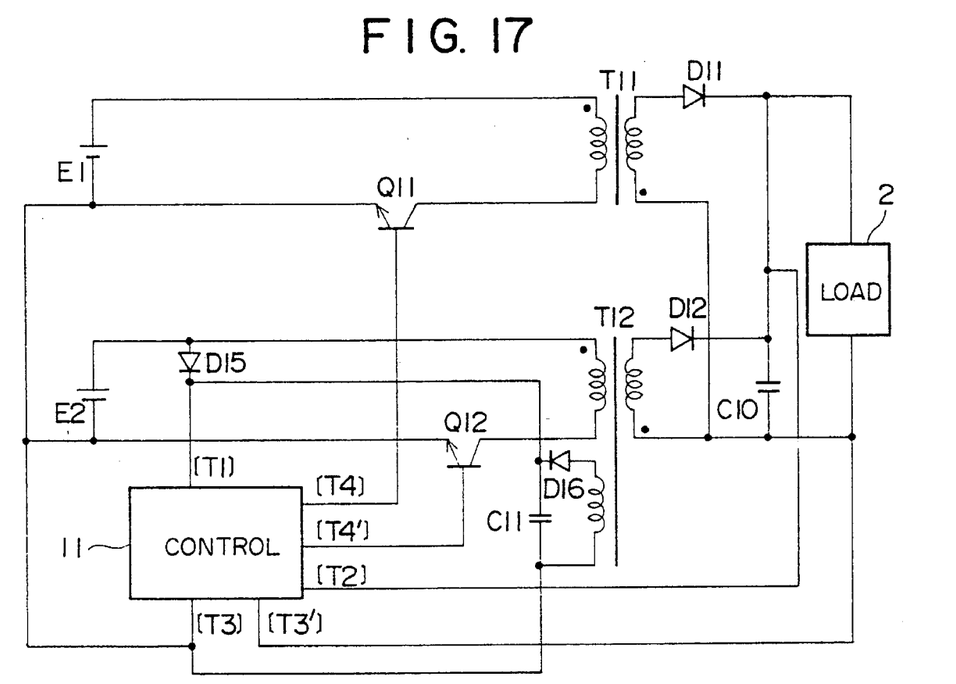
FIG. 17 is a circuit diagram showing a seventh embodiment of the DC—DC converter according to the present invention.

Next, a description will be given of a seventh embodiment of the DC—DC converter according to the present invention, by referring to FIG. 17. In FIG. 17, those parts which are the same as those corresponding parts in FIG. 11 are designated by the same reference numerals, and a description thereof will be omitted.

This embodiment is basically the same as the second embodiment shown in FIG. 11, except for the method supplying power to the control circuit 11. The second embodiment shown in FIG. 11 supplies power to the control circuit 11 directly from the battery E2. However, this embodiment provides a third winding on the transformer T12, and uses a voltage generated at this third winding to power the control circuit 11. More particularly, the voltage generated at the third winding of the transformer T12 is rectified by a diode D16, smoothened by a capacitor C11, and converted into a DC voltage which is input to the power input terminal [T1]of the control circuit 11 via the diode D16. Because it is necessary to operate the control circuit 11 also at the start of the operation of the DC—DC converter, the voltage from the battery E2 is also input to the power input terminal [T1]of the control circuit 11 via a diode D15.

According to this embodiment, a high DC voltage can be obtained by a rectifying circuit of the third winding of the transformer T12. Since the high voltage can be input to the power input terminal [T1]of the control circuit 11, it is possible to positively turn ON/OFF the switching transistors Q11 and Q12 which are made up of FETs, similarly as in the sixth embodiment, thereby contributing to the stable operation of the DC—DC converter.

Figure 18:
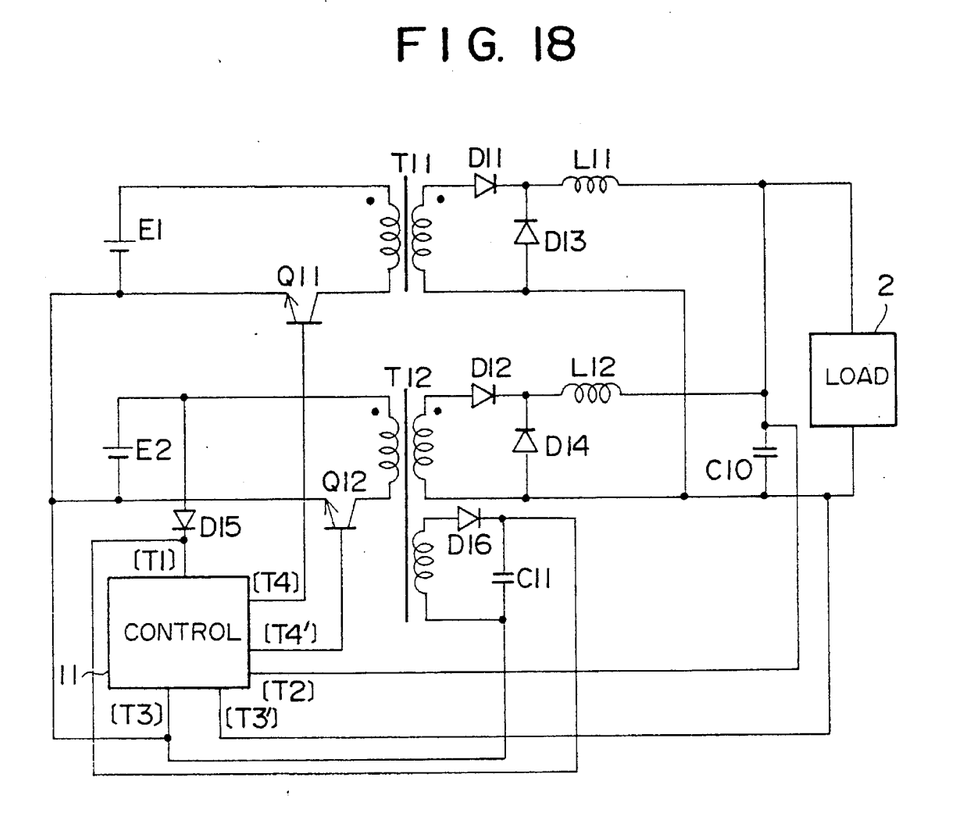
FIG. 18 is a circuit diagram showing an eighth embodiment of the DC—DC converter according to the present invention.

Next, a description will be given of an eighth embodiment of the DC—DC converter according to the present invention, by referring to FIG. 18. In FIG. 18, those parts which are the same as those corresponding parts in FIG. 14 are designated by the same reference numerals, and a description thereof will be omitted.

This embodiment is basically the same as the fourth embodiment shown in FIG. 14, except for the method of supplying power to the control circuit 11. The fourth embodiment shown in FIG. 14 supplies power to the control circuit 11 directly from the battery E2. However, this embodiment provides a third winding on the transformer T12, and uses a voltage generated at this third winding to power the control circuit 11. More particularly, the voltage generated at the third winding of the transformer T12 is rectified by a diode D16, smoothened by a capacitor C11, and converted into a DC voltage which is input to the power input terminal [T1] of the control circuit 11 via the diode D16. Because it is necessary to operate the control circuit 11 also at the start of the operation of the DC—DC converter, the voltage from the battery E2 is also input to the power input terminal [T1] of the control circuit 11 via a diode D15.

According to this embodiment, a high DC voltage can be obtained by a rectifying circuit of the third winding of the transformer T12. Since the high voltage can be input to the power input terminal [T1] of the control circuit 11, it is possible to positively turn ON/OFF the switching transistors Q11 and Q12 which are made up of FETs, similarly as in the sixth embodiment, thereby contributing to the stable operation of the DC—DC converter.

In the embodiments described above, the battery voltage is used as the input voltage of the DC—DC converter. However, the input voltage of the DC—DC converter is not limited to the battery voltage. For example, it is possible to used as the input voltage a DC voltage output from a DC power source which generates the DC voltage from an AC voltage. In addition, the described embodiments supply the outputs of two converters which are connected in parallel to the load. However, the present invention is not limited to such an arrangement of converters, and it is of course possible to supply outputs of three or more converters which are connected in parallel to the load.

In the embodiments described above, the load 2 which is powered by the DC—DC converter may be an internal circuit of a portable telephone, for example. In such a case, the power consumption of the portable telephone is 3 W, for example, and the DC—DC converter outputs a voltage in a range of 5 V to 10 V in response to an input voltage (that is, battery voltage) in a range of 1 V to 3 V.

Further, the present invention is not limited to these embodiments, but various variations and modifications may be made without departing from the scope of the present invention.

What is claimed is:

1. A parallel control type DC—DC converter for producing an output voltage at a common output node, connected to a load, based on voltages supplied from independent power sources, said DC—DC converter comprising:

at least first and second converters powered by the voltages supplied from respective said independent power sources and producing corresponding outputs, said at least first and second converters being commonly grounded and each of said at least first and second converters including a respective switching element;

a common control circuit driving the respective switching elements of said at least first and second converters by ON-pulses having a common width, selectively varied depending on the output voltage; and said at least first and second converters further comprising respective, individual diodes connecting the corresponding outputs thereof to the common output node in parallel for producing said output voltage, the individual, respective diode of each converter being commonly operative for both rectifying and coupling purposes, the coupling purpose being that of blocking reverse-current flow into each of the at least first and second converters having a lower output voltage than another thereof.

2. The DC—DC converter as claimed in claim 1, wherein each of said at least first and second converters is commonly selected from a group consisting of boost type converters, forward type converters and back-boost type converters.

3. The DC—DC converter as claimed in claim 1, wherein said common control circuit is powered by at least one of the independent power sources.

4. The DC—DC converters as claimed in claim 1, wherein each of said at least first and second converters further comprises a respective transformer of a commonly selected one of boost type and back type transformers, each said commonly selected transformer having associated primary and secondary windings, and said DC—DC converter further comprises means for rectifying a voltage induced in the secondary winding of one of said transformer into a DC voltage which is supplied to and powers said common control circuit.

5. The DC—DC converter as claimed in claim 1, wherein said common control circuit is powered at least in part by the output voltage of a selected one of said at least first and second converters.

6. The DC—DC converter as claimed in claim 1, wherein each of said at least first and second converters is powered by a respective, independent power source comprising a corresponding battery.

7. A parallel control type DC—DC converter for supplying an output voltage at a common output node, connected to a load, based on voltages supplied from independent power sources, said DC—DC converter comprising:

at least first and second back type converters powered by the voltages supplied from respective said independent power sources and producing corresponding outputs, said at least first and second converters being commonly grounded and each of said first and second back type converters including a respective switching element;

a common control circuit driving the respective switching elements of said at least first and second back type converters by ON-pulses having a common width, selectively varied depending on the output voltage; and each of said at least first and second back type converters further comprising a respective, series-connected choke coil and individual diode circuit coupling the corresponding output thereof to the common output node in parallel for producing said output voltage.

8. The DC—DC converter as claimed in claim 1, wherein said common control circuit is powered by at least one of the independent power sources.

9. The DC—DC converter as claimed in claim 7 wherein each of said at first and second back type converters is powered by a respective, independent power source comprising a corresponding battery.

* * * * *

UNITED STATES PATENT AND TRADEMARK OFFICE
CERTIFICATE OF CORRECTION

PATENT NO. : 5,583,753
DATED : Dec. 10, 1996
INVENTOR(S) : TAKAYAMA

It is certified that error appears in the above-indentified patent and that said Letters Patent is hereby corrected as shown below:

Col. 1, line 15, delete "for portable" (second occurrence);
line 38, after "power" insert --.--;
line 49, change "diode, moreover" to --diode. Moreover,--.

Col. 5, line 16, delete "are";
line 40, after "prior art" insert --as illustrated in FIGS. 1-5 as described above--.

Col. 6, line 49, delete "this";
line 55, change "[T4']" to --[T4]--.

Col. 7, line 28, change "during" to --following--;
line 40, change "E1($t_{ON+tOFF}$) > E2($t_{ON+tOFF}$)" to --E1($t_{ON} + t_{OFF}$) > E2($t_{ON} + t_{OFF}$)--.

Col. 10, line 38, change "E2$t_{ON}$ and $t_{OFF=tOFF}$" to --E2·$t_{ON}$ and $t_{OFF} = t_{OFF}$--
line 45, change "$t_{OFF7}$" to --$t_{OFF}$,--.

Col. 11, line 13, change "[T4']" to --[T4]--.

Col. 12, line 27, delete "- -";
line 28, after "D12" delete "- -"; and after "route" delete "- -";
line 29, change "D12" to --D11--.

UNITED STATES PATENT AND TRADEMARK OFFICE
CERTIFICATE OF CORRECTION

PATENT NO. : 5,583,753
DATED : Dec. 10, 1996
INVENTOR(S) : TAKAYAMA

It is certified that error appears in the above-indentified patent and that said Letters Patent is hereby corrected as shown below:

Col. 14, line 27 (Claim 4, line 8), change "transformer" to --transformers--;
         line 59 (Claim 8, line 1), change "1" to --7--;
         line 63 (Claim 9, line 2), after "said at" insert --least--.

Signed and Sealed this

Eighth Day of July, 1997

Attest:

BRUCE LEHMAN

*Attesting Officer*  *Commissioner of Patents and Trademarks*